(12) United States Patent
Kang et al.

(10) Patent No.: US 9,513,504 B2
(45) Date of Patent: Dec. 6, 2016

(54) LIQUID CRYSTAL DISPLAY AND MANUFACTURING METHOD THEREOF

(71) Applicant: Samsung Display Co., Ltd., Yongin (KR)

(72) Inventors: Min Jung Kang, Incheon (KR); Yi Seop Shim, Suwon-si (KR); Nu Ree Um, Icheon-si (KR); Chul Huh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/659,713

(22) Filed: Mar. 17, 2015

(65) Prior Publication Data
US 2016/0026033 A1 Jan. 28, 2016

(30) Foreign Application Priority Data
Jul. 25, 2014 (KR) ........................ 10-2014-0095096

(51) Int. Cl.
*G02F 1/1335* (2006.01)
*G02F 1/1339* (2006.01)

(52) U.S. Cl.
CPC ..... *G02F 1/133512* (2013.01); *G02F 1/13394* (2013.01); *G02F 1/133514* (2013.01)

(58) Field of Classification Search
CPC ...... G02F 1/13; G02F 1/13394; G02F 1/1335; G02F 1/133509; G02F 1/133512; G02F 1/133514; G02F 1/133516; G02F 1/1339; G02F 1/134309; G02F 1/1333; G02F 1/1368; G02F 1/133345; G02F 1/136; G02F 1/1362; G02F 1/136209; G02F 1/136286; G02F 2001/13398; G02F 2001/13396; G02F 2201/52; H01J 2329/323; H01J 2329/8625; H01J 2329/863; H01J 2329/864; H01J 29/864; H01J 29/458; H01J 29/4908; H01J 29/78678; H01J 27/1288
USPC ......... 349/106, 155, 110, 187, 156, 43, 138, 349/42, 158, 56
See application file for complete search history.

(56) References Cited

U.S. PATENT DOCUMENTS

2006/0274220 A1* 12/2006 Kim ................... G02F 1/13394
349/56
2007/0069204 A1* 3/2007 Jang ................... G02F 1/13394
257/40
2014/0055696 A1 2/2014 Lee et al.

FOREIGN PATENT DOCUMENTS

| KR | 10-2006-0008122 | 1/2006 |
| KR | 10-2006-0057197 | 5/2006 |
| KR | 10-2007-0002674 | 1/2007 |
| KR | 10-2008-0047712 | 5/2008 |

* cited by examiner

*Primary Examiner* — Thoi Duong
(74) *Attorney, Agent, or Firm* — H.C. Park & Associates, PLC (57) ABSTRACT

A liquid crystal display includes: a first substrate and a second substrate facing the first substrate; a column spacer disposed on the first substrate; a light blocking member disposed on the second substrate; and a liquid crystal layer disposed between the first substrate and the second substrate. The light blocking member includes a dome shaped portion having a concave surface.

18 Claims, 7 Drawing Sheets

LIQUID CRYSTAL DISPLAY AND MANUFACTURING METHOD THEREOF

CROSS-REFERENCE TO RELATED APPLICATION

This application claims priority from and the benefit of Korean Patent Application No. 10-2014-0095096, filed on Jul. 25, 2014, which is hereby incorporated by reference for all purposes as if fully set forth herein.

BACKGROUND

1. Field

The present disclosure relates to a liquid crystal display and a manufacturing method thereof.

2. Discussion of the Background

A liquid crystal display, which is one of the most widely used flat panel displays, generally includes two substrates with field generating electrodes, such as a pixel electrode and a common electrode, and a liquid crystal layer interposed therebetween. An amount of transmitted light is controlled by determining an alignment of liquid crystal molecules of the liquid crystal layer through an application of voltages to the field generating electrodes to display an image.

A gap between the liquid crystal layers of the two display panels is called a cell gap, and the cell gap affects general operation characteristics of the liquid crystal display, such as a response speed, a contrast ratio, a viewing angle, and luminance uniformity. If the cell gap is not constant, a uniform image is not displayed over the entire screen, causing defects in an image quality. Therefore, a plurality of spacers may be formed on one side of two substrates in order to maintain the uniform cell gap over the entire region on the substrate. A column spacer is widely used for the spacer.

A column spacer may be formed as a cylinder, a truncated circular cone, or a hemisphere on a color filter substrate, and it is disposed to correspond to a thin film transistor or a gate line formed on a thin film transistor substrate.

However, when a pressure is applied in a direction which is perpendicular with respect to plate surfaces of respective substrates or impacts are applied thereto, the column spacer may slide away from its normal position and a gap between the respective substrates may not be maintained.

Further, if the column spacer disposed to correspond to a thin film transistor slides, it may cause a tapped light leakage or generate a cold bubble fault caused by a contraction and relaxation of an amount of liquid crystal.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display for maintaining a cell gap when a substrate is bent or an impact is applied by forming a black matrix in a dome shape, and a manufacturing method thereof.

An exemplary embodiment of the present invention provides a liquid crystal display including: a first substrate and a second substrate facing the first substrate; a column spacer disposed on the first substrate; a light blocking member disposed on the second substrate to face the column spacer; and a liquid crystal layer disposed between the first substrate and the second substrate. The light blocking member includes a dome shaped portion having a concave surface.

An exemplary embodiment of the present invention provides a method for manufacturing a liquid crystal display, including: forming a color filter on a first substrate; forming a column spacer on the color filter; and forming a light blocking member on a second substrate facing the first substrate. The light blocking member includes a dome shaped portion and the center of the dome shaped portion is concave.

An exemplary embodiment of the present invention provides a liquid crystal u) display, comprising: a first substrate and a second substrate facing the first substrate; a column spacer disposed on the first substrate; a light blocking member disposed on the second substrate to face the column spacer; and a liquid crystal layer disposed between the first substrate and the second substrate. The dome shaped portion has a concave groove in which a portion of the column spacer is configured to be accommodated.

Other characteristics and advantages of the present invention will be described hereinafter, and will be clearly understood by a person skilled in the art in the related technical field.

DETAILED DESCRIPTION OF THE ILLUSTRATED EMBODIMENTS

The present invention will be described more fully hereinafter with reference to the accompanying drawings, in which exemplary embodiments of the invention are shown. However, it is to be understood that the invention is not limited to the disclosed embodiments, but, on the contrary, is intended to cover various modifications. As those skilled in the art would realize, the described embodiments may be modified in various different ways, all without departing from the spirit or scope of the present invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification.

Exemplary embodiments of the present invention will now be described in detail with reference to accompanying drawings.

Figure 1:
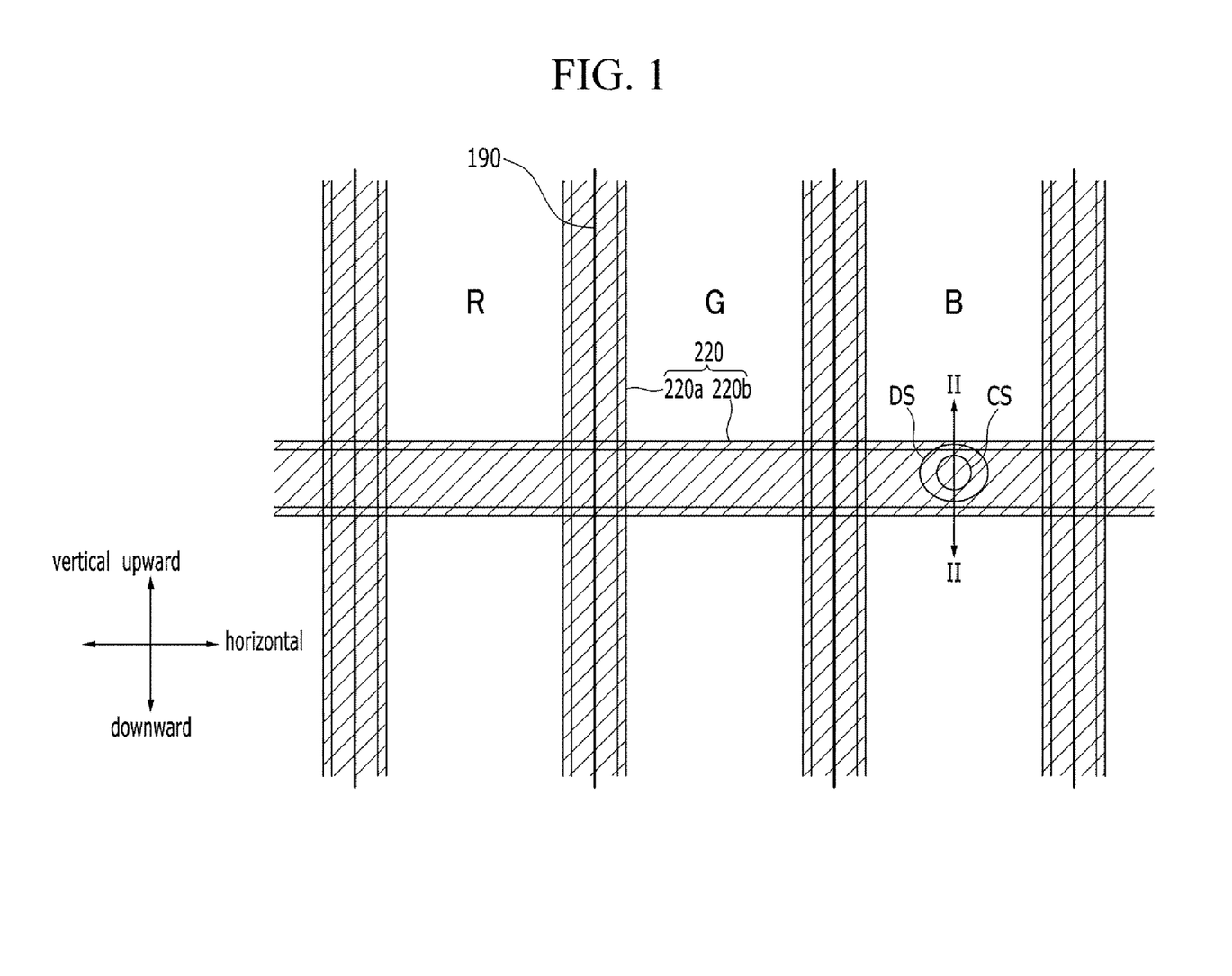
FIG. 1 shows a top plan view of a liquid crystal display according to an exemplary embodiment of the present invention.
Figure 2:
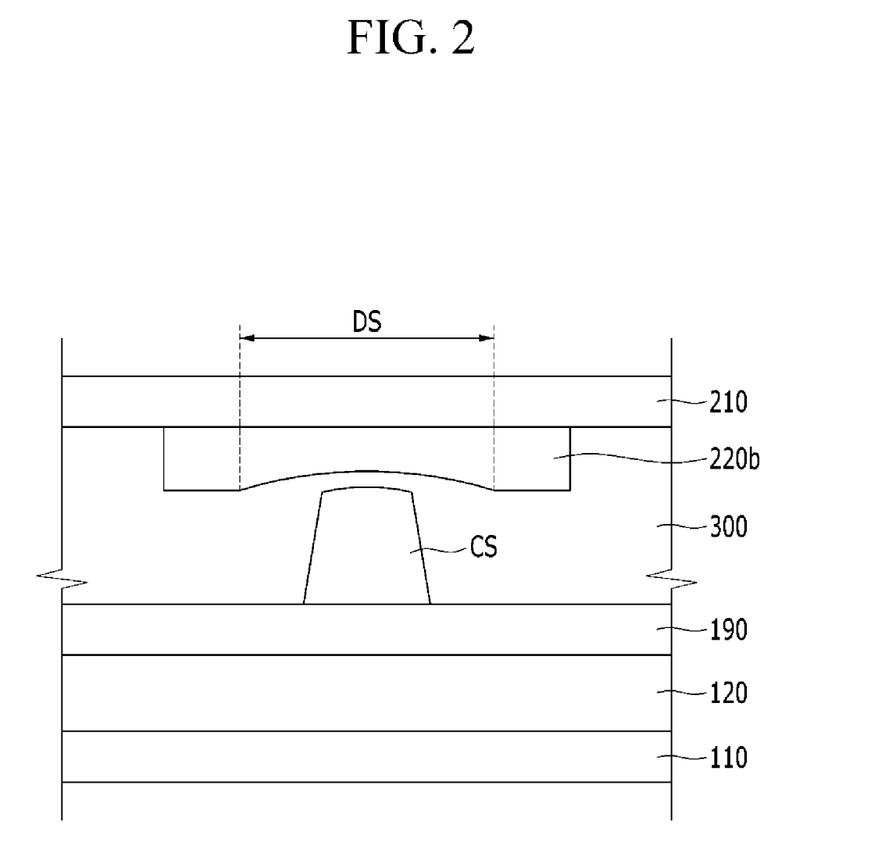
FIG. 2 shows a cross-sectional view with respect to a line II-II of FIG. 1.

FIG. 1 shows a top plan view of a liquid crystal display according to an exemplary embodiment of the present invention. FIG. 2 shows a cross-sectional view with respect to a line II-II of FIG. 1.

Referring to FIG. 1 and FIG. 2, a film structure 120 including a thin film transistor is provided on a first substrate 110. The thin film transistor may be a switching element and includes a control terminal, an input terminal, and an output terminal, which will be described in more detail later.

A plurality of color filters 190 are provided on the film structure 120. The color filters 190 include a red color filter (R), a green color filter (G), and a blue color filter (B) that may be arranged to be separated. However, aspects of the invention are not limited thereto, such that the color filter may include other color filter other than red, blue, and green, and at least one of the red color filter (R), the green color filter (G), and the blue color filter (B) may be replaced with other color filter. The color filters 190 may be disposed in parallel in a horizontal direction, and they can be formed as stripes in a vertical direction. The color filters 190 can be separated from each other in the horizontal direction or their edges can overlap each other.

The color filters 190 may be manufactured by using a colored photosensitive organic material according to a known pigment dispersion method.

A column spacer (CS) is provided on the color filters 190.

The column spacer (CS) is protruded and disposed to substantially have a cylinder, a truncated circular cone, or a hemisphere shape on the first substrate 110, and maintains a gap from a second substrate 210. The column spacer (CS) may include an elastic material, such as a thermosetting resin including an acryl. The top surface of the column spacer (CS) may have a flat surface. Further, the top surface of the column spacer (CS) may have a convex shape so that a relatively wider area of the top surface of the column spacer (CS) contacts the concave surface of a second light blocking member 220b.

A light blocking member 220 is provided on the second substrate 210. The light blocking member 220 includes a first light blocking member 220a and the second light blocking member 220b. The light blocking member 220 may be made from a black matrix mask, but aspects of the invention are not limited as such.

The first light blocking member 220a is provided to overlap an edge of the neighboring color filter 190.

The first light blocking member 220a may extend along the vertical direction, and although not shown, it can be provided in a direction in which a data line of the thin film transistor is extended.

The second light blocking member 220b is arranged in the horizontal direction to cover at least a portion of the color filter 190, and it may be formed by crossing the first light blocking member 220a.

Although not shown, the second light blocking member 220b can be provided in a direction in which the gate line of the thin film transistor is extended.

The second light blocking member 220b includes a dome shaped portion (DS) of which has a concave surface or shape. The dome shaped portion (DS) may be located at a central region of the second light blocking member 220b.

The column spacer (CS) may be provided to correspond to the dome shaped portion (DS).

More specifically, the light blocking member 220 provided on an opposing surface of the column spacer (CS) is formed to have a dome shaped portion (DS) having a concave surface or shape so the respective first substrate 110 and second substrate 210 can be restored to their original positions when they are bent or are separated because of an external force, and the cell gap can be maintained. The dome shaped portion (CS) may be formed to be circular or oval, and can be formed to have various shapes of which the center is concave.

The first substrate 110 and the second substrate 210 are bonded to each other by using a sealant (not shown), and a liquid crystal layer 300 is disposed between the substrates 110 and 210.

A more detailed structure of a liquid crystal display incorporating the exemplary embodiment of FIG. 1 and FIG. 2 will now be described with reference to FIG. 3 and FIG. 4.

Figure 3:
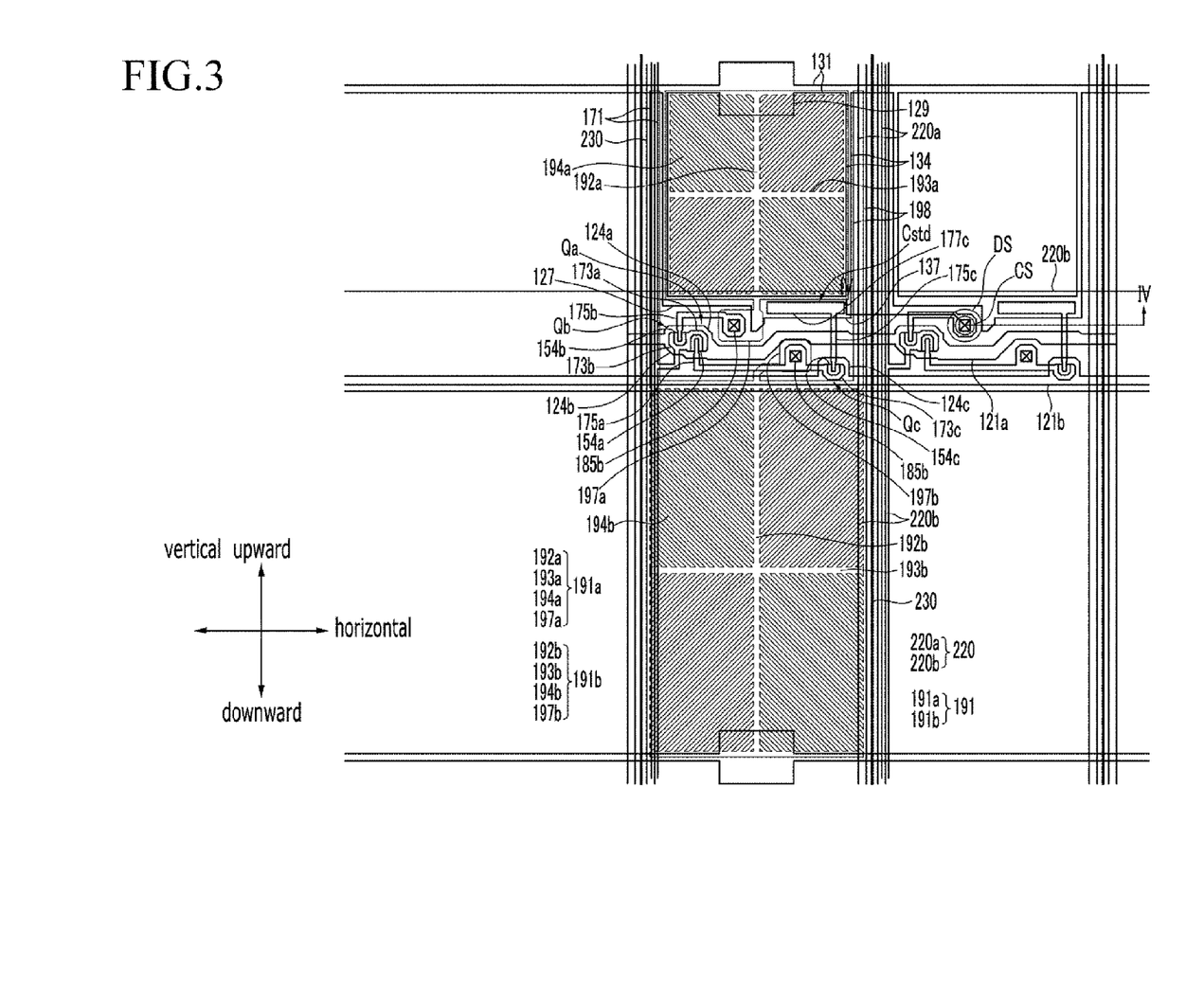
FIG. 3 shows a top plan view of a liquid crystal display incorporating the exemplary embodiment of FIG. 1.
Figure 4:
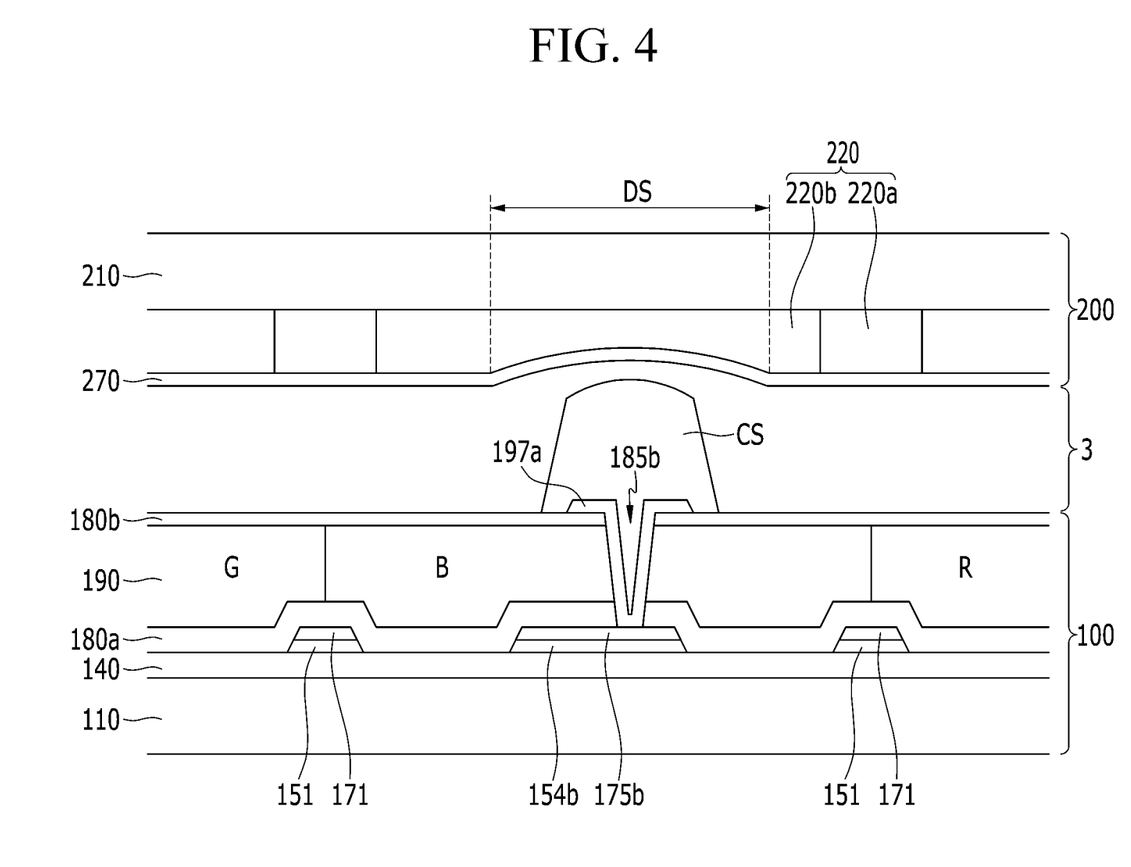
FIG. 4 shows a cross-sectional view with respect to a line IV-IV of FIG. 3.

FIG. 3 shows a top plan view of a liquid crystal display incorporating the exemplary embodiment of FIG. 1 and FIG. 2, and FIG. 4 shows a cross-sectional view with respect to a line IV-IV of FIG. 3.

Referring to FIG. 3 and FIG. 4, a liquid crystal display includes a lower panel 100 and an upper panel 200 facing the lower panel 100, and a liquid crystal layer 300 provided between the lower panel 100 and the upper panel 200.

The lower panel 100 will now be described with reference to FIG. 3 and FIG. 4.

A plurality of gate conductors may include a plurality of storage electrode lines 131 and a plurality of gate lines, which include a first gate line 121a and a second gate line 121b. The plurality of gate conductors may be disposed on the first substrate 110 including a pixel area.

The first gate line 121a and the second gate line 121b are mainly extended in the horizontal direction and may transmit a gate signal. The first gate line 121a includes a first gate electrode 124a and a second gate electrode 124b protruded upward and downward, and the second gate line 121b includes a third gate electrode 124c protruded upward. The first gate electrode 124a is connected to the second gate electrode 124b to form a projection.

The storage electrode line 131 is mainly extended in the horizontal direction and may transmit a predetermined voltage such as a common voltage Vcom. The storage electrode line 131 includes a storage electrode 129 protruded upward and downward, a pair of vertical portions 134 extended downward to be substantially perpendicular to the first and second gate lines 121a and 121b, and a horizontal portion 127 for connecting ends of the pair of vertical portions 134. The horizontal portion 127 includes a capacitive electrode 137 extended downward.

A gate insulating layer 140 is disposed on the first gate conductor 121a, the second gate conductor 121b, and the storage electrode line 131.

A plurality of semiconductor stripes 151 made of amorphous silicon or crystalline silicon are disposed on the gate insulating layer 140. The semiconductor stripes 151 are mainly extended in the vertical direction, and include first and second semiconductors 154a and 154b, which extend toward the first and second gate electrodes 124a and 124b, respectively, and a third semiconductor 154c provided on the third gate electrode 124c. The first and second semiconductors 154a and 154b may be connected to each other.

A plurality of pairs of ohmic contacts (not shown) are disposed on the first, second, and third semiconductors 154a, 154b, and 154c. The ohmic contacts may include a material such as a silicide or n+ hydrogenated amorphous silicon to which a highly concentrated n-type impurity may be doped.

A data conductor including a plurality of data lines 171, a plurality of first drain electrodes 175a, a plurality of second drain electrodes 175b, and a plurality of third drain electrodes 175c is disposed on the ohmic contacts.

The plurality of data lines 171 may transmit a data signal and are mainly extended in the vertical direction to cross the gate lines 121a and 121b. The data lines 171 include a first source electrode 173a and a second source electrode 173b, which extend toward the first gate electrode 124a and the second gate electrode 124b, respectively. The first source electrode 173a and the second source electrode 173b may be connected to each other.

The first drain electrode 175a, the second drain electrode 175b, and the third drain electrode 175c include a wide end portion and a bar end portion. The bar end of the first drain electrode 175a and the second drain electrode 175b are partially surrounded by the first source electrode 173a and the second source electrode 173b. The wide end portion of first drain electrode 175a is extended to form a U-shaped third drain electrode 175c. A wide end portion 177c of a third source electrode 173c overlaps the capacitive electrode 137 to form a step-down capacitor (Cstd), and a bar end portion thereof is partially surrounded by the third drain electrode 175c.

The first gate electrode 124a, the first source electrode 173a, and the first drain electrode 175a form a first thin film transistor Qa together with the first semiconductor 154a. The second gate electrode 124b, the second source electrode 173b, and the second drain electrode 175b form a second thin film transistor Qb together with the second semiconductor 154b. The third gate electrode 124c, the third source electrode 173c, and the third drain electrode 175c form a third thin film transistor Qc together with the third semiconductor 154c.

The semiconductor stripe 151 including the first semiconductor 154a, the second semiconductor 154b, and the third semiconductor 154c can have substantially the same plane shape as the data conductors (e.g., 171, 173a, 173b, 173c, 175a, 175b, and 175c) and the ohmic contacts except for channel regions between the first source electrode 173a, second source electrode 173b, and third source electrode 173c, and channel regions between the first drain electrodes 175a, second drain electrode 175b, and third drain electrode 175c, respectively.

The first semiconductor 154a has a portion that is not covered but is exposed by the first source electrode 173a and the first drain electrode 175a between the first source electrode 173a and the first drain electrode 175a. The second semiconductor 154b has a portion that is not covered but is exposed by the second source electrode 173b and the second drain electrode 175b between the second source electrode 173b and the second drain electrode 175b. The third semiconductor 154c has a portion that is not covered but is exposed by the third source electrode 173c and the third drain electrode 175c between the third source electrode 173c and the third drain electrode 175c.

A first passivation layer 180a may include an inorganic insulator, such as a silicon nitride or a silicon oxide is disposed on the data conductors (e.g., 171, 173a, 173b, 173c, 175a, 175b, and 175c) and the exposed portions of the semiconductors 154a, 154b, and 154c.

A plurality of color filters 190 are provided on the first passivation layer 180a. The color filters 190 include a red color filter, a green color filter, and a blue color filter that are arranged in parallel with each other. The color filters 190 are disposed in parallel with each other in the horizontal direction, and they can be formed as stripes in the vertical direction.

A second passivation layer 180b is provided on the color filters 190. The second passivation layer 180b can be formed with an organic layer or an inorganic layer, and it may be more desirable to form the same with an inorganic layer so that an effect caused by a step of the first light blocking member 220a to be described may be well shown in the present exemplary embodiment. This is because the layer is made flat when the second passivation layer 180b is formed with an organic layer. The second passivation layer 180b may be omitted according to aspects of the invention.

A pixel electrode 191 including a first subpixel electrode 191a and a second subpixel electrode 191b is disposed on the second passivation layer 180b. The first subpixel electrode 191a and the second subpixel electrode 191b are separated from each other with a first gate line 121a and a second gate line 121b therebetween. The first subpixel electrode 191a is disposed above the first and second gate lines 121a and 121b, and the second subpixel electrode 191b is disposed below the first and second gate lines 121a and 121b. The first subpixel electrode 191a and the second subpixel electrode 191b are arranged along the vertical direction and thus disposed in the same column. The second subpixel electrode 191b may be taller than the first subpixel electrode 191a by about one to three times.

The first subpixel electrode 191a and the second subpixel electrode 191b have a quadrangular shape and include a cross stem configured with horizontal stems, including first and second horizontal stems 193a and 193b, and vertical stems, including first and second vertical stems 192a and 192b crossing the first and second horizontal stems 193a and 193b. The first subpixel electrode 191a and the second subpixel electrode 191b include a plurality of fine branches, including a first and second fine branches 194a and 194b, a lower projection 197a, and an upper projection 197b.

The pixel electrode 191 is divided into four subregions by the first and second horizontal stems 193a and 193b and the first and second vertical stems 192a and 192b. The first and second fine branches 194a and 194b are respectively extended from the first and second horizontal stems 193a and 193b and the first and second vertical stems 192a and 192b by 45 or 135 degrees with respect to the first and second gate lines 121a and 121b or the first and second horizontal stems 193a and 193b. The first and second fine branches 194a and 194b of two neighboring subregions may be perpendicular.

According to aspects of the invention, the first subpixel electrode 191a further includes an outer stem for wrapping an outer side, and the second subpixel electrode 191b further includes a horizontal portion provided at the top and bottom and a right and left vertical portion 198 on the right and left of the first subpixel electrode 191a. The right and left vertical portion 198 may prevent or impede capacitive coupling between the data line 171 and the first subpixel electrode 191a. The right and left vertical portion 198 may be omitted.

A plurality of first contact holes 185a and a plurality of second contact holes 185b for exposing a wide end portion of the first drain electrode 175a and a wide end portion of the second drain electrode 175b are formed on the first passivation layer 180a, the color filter 190, and the second passivation layer 180b. The first contact hole 185a connects the second subpixel electrode 191b and the third drain electrode 175*c*, and the second contact hole 185*b* connects the first subpixel electrode 191*a* and the second drain electrode 175*b*.

A column spacer (CS) is provided on the second passivation layer 180*b*.

The column spacer (CS) is protruded and may be formed to substantially have a cylinder, a truncated circular cone, or a hemisphere shape on the first substrate 110. The column spacer (CS) maintains a gap from the second substrate 210.

According to aspects of the invention, the column spacer (CS) may be formed to correspond to the first contact hole 185*a* or the second contact hole 185*b*. However, without limiting the locations of the column spaces (CS), it can be provided to other portions on the second passivation layer 180*b* that correspond to the dome shaped portion (DS) of the light blocking member 220.

Regarding the upper panel 200, a light blocking member 220 is provided on the upper substrate 210.

The light blocking member 220 includes a first light blocking member 220*a* and a second light blocking member 220*b*.

The first light blocking member 220*a* is provided at a position that overlaps an edge of the neighboring color filter 190 in a direction in which the data line 171 is extended, and the second light blocking member 220*b* is formed to cross the first light blocking member 220*a* in the horizontal direction to cover the color filter 190.

The second light blocking member 220*b* includes a dome shaped portion (DS) having a concave surface or shape, and the column spacer (CS) may be disposed to correspond to the dome shaped portion (DS).

More specifically, the light blocking member 220 provided on an opposing surface of the column spacer (CS) is formed to have a dome shaped portion (DS) with a concave surface or shape so the respective first and second substrates 110 and 210 can be easily restored to their original positions after they are bent or are separated, and the cell gap is maintained. In an example, the first and second substrates 110 and 210 may be separated due to an external force, impact or the like. The dome shaped portion (CS) may be formed to be circular or oval, and may be formed to have various shapes of which the center is concave.

A common electrode 270 is disposed on the light blocking member 220, and an upper alignment layer (not shown) is formed on the common electrode 270. The common electrode 270 may transmit a common voltage.

The liquid crystal layer 300 may have negative dielectric anisotropy, and liquid crystal molecules of the liquid crystal layer 300 may be aligned so that their long axes may be perpendicular to the surfaces of the first and second display panels 100 and 200 while there is no electric field. The liquid crystal layer 300 includes an alignment aid including a reactive mesogen so the liquid crystal molecules can have a pretilt so that the long axes may be substantially parallel in a length direction of the first and second fine branches 194*a* and 194*b* of the pixel electrode 191. The alignment aid may be included not in the liquid crystal layer but in the alignment layer.

The thin film transistor described with reference to FIG. 3 and FIG. 4 is shown as an exemplary embodiment, and the film structure including the thin film transistor is modifiable to various forms.

Figure 5:
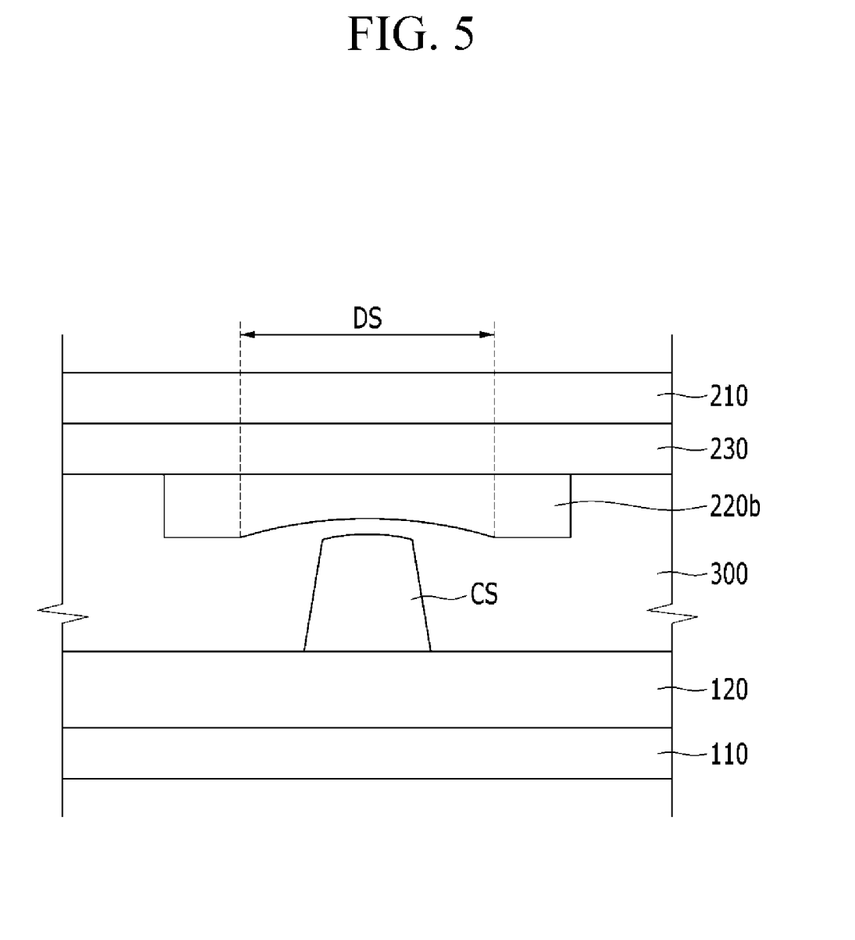
FIG. 5 shows a top plan view of a liquid crystal display according to an exemplary embodiment of the present invention.

FIG. 5 shows a top plan view of a liquid crystal display according to an exemplary embodiment of the present invention. The liquid crystal display may correspond to the liquid crystal display described with reference to FIG. 1 and FIG. 2 except for modification of the position of a color filter 230. Hence, like constitutional elements except the color filter 230 have like reference numerals, and no repeated descriptions on the like constitutional elements will be provided.

Referring to FIG. 5, a plurality of color filters 230 are provided on the second substrate 210, and a light blocking member 220 is provided on the color filters 230.

The light blocking member 220 includes a first light blocking member 220*a* and a second light blocking member 220*b*.

The first light blocking member 220*a* is provided at a position that overlaps an edge of the neighboring color filter 230 in a direction in which the data line 171 is extended, and the second light blocking member 220*b* is formed to cross the first light blocking member 220*a* in the horizontal direction to cover the color filter 230.

The second light blocking member 220*b* includes a dome shaped portion (DS) having a concave surface or shape, and the column spacer (CS) is provided corresponding to the dome shaped portion (DS).

A method for manufacturing a liquid crystal display according to an exemplary embodiment of the present invention will now be described with reference to FIG. 6 and FIG. 7.

Figure 6:
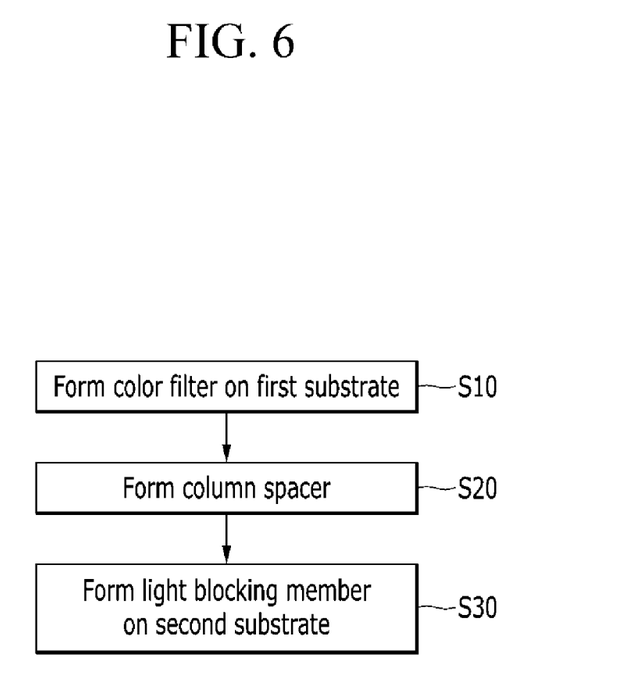
FIG. 6 is a flowchart illustrating a method for manufacturing a liquid crystal display according to an exemplary embodiment of the present invention.
Figure 7:
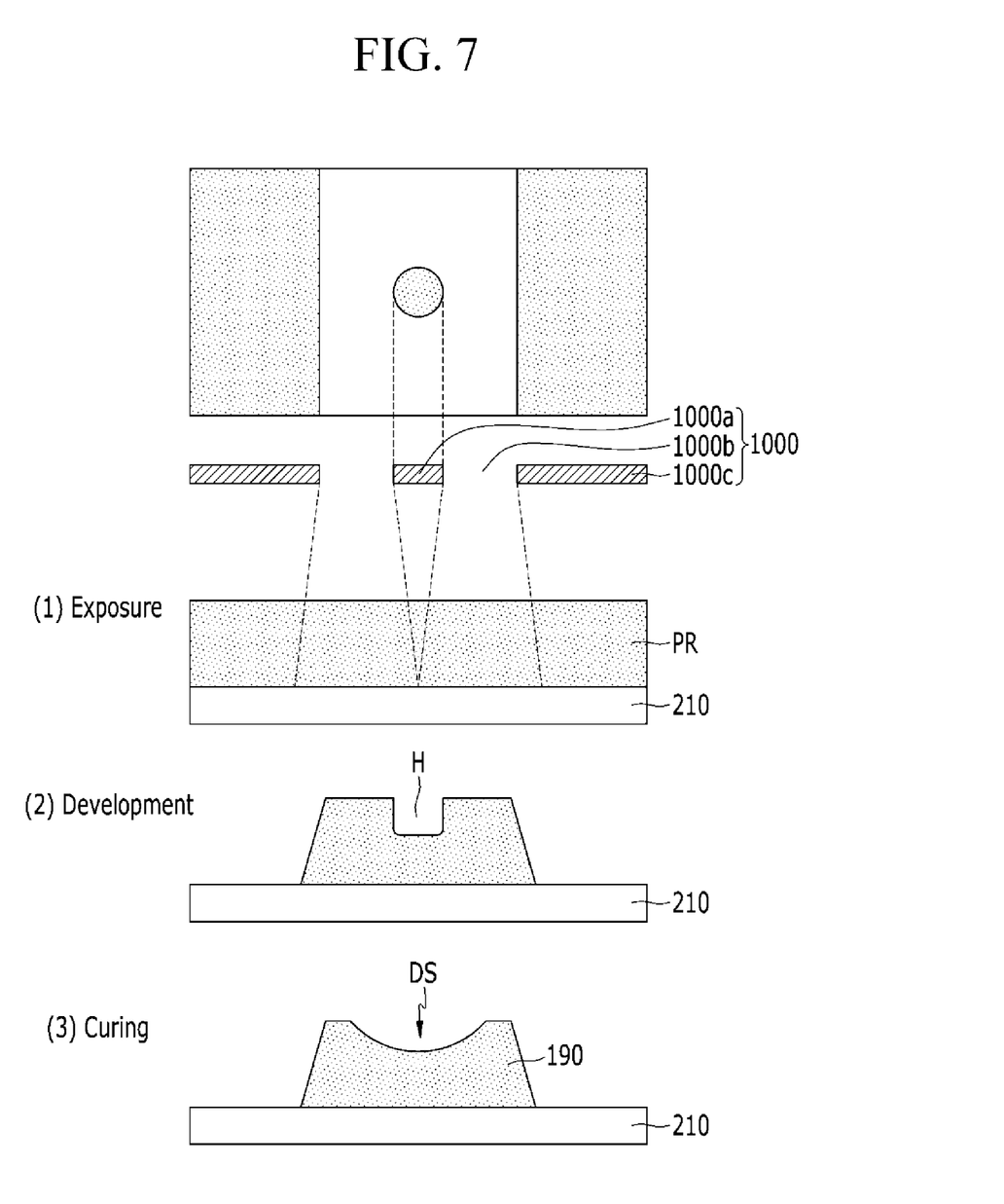
FIG. 7 illustrates a method for manufacturing a light blocking member of a liquid crystal display according to an exemplary embodiment of the present invention.

FIG. 6 is a flowchart illustrating a method for manufacturing a liquid crystal display according to an exemplary embodiment of the present invention, and FIG. 7 illustrates a method for manufacturing a light blocking member of a liquid crystal display according to an exemplary embodiment of the present invention.

Referring to FIG. 6, a color filter is disposed on the first substrate 110 (S10) as described with reference to FIG. 3 and FIG. 4. However, although method of FIG. 6 is described with reference to liquid crystal display of FIG. 3 and FIG. 4, aspects of the invention are not limited thereto.

A film structure including a thin film transistor structure is disposed on the first substrate, and a color filter 190 is disposed on the film structure including a thin film transistor structure.

The color filter 190 may be formed by using a photolithography process, and it may also be formed by an inkjet method.

A column spacer may be disposed on the color filter 190 (S20).

The column spacer may be disposed at a position corresponding to the dome shaped portion of the light blocking member 220.

The light blocking member 220 may be disposed on a second substrate (S30).

The light blocking member 220 may include the dome shaped portion having a concave surface or shape at its central region.

Referring to FIG. 7, the light blocking member 220 may be formed by coating a photoresist (PR) on the second substrate 210, and performing an exposure process by using a mask 1000 including a first region 1000*a*, a second region 1000*b*, and a third region 1000*c*.

The first region 1000*a* may block the light generated by a light exposer (not shown) and corresponds to the dome shaped portion (DS). The second region 1000*b* may allow the light generated by the light exposer to pass through. The third region 1000*c* may block the light generated by the light exposer.

More specifically, according to an exposure using a negative photoresist, the photoresist of the third region 1000*c* is removed, and the light blocking member having a groove (H) can be pattern-formed in the first region 1000*a*. Further, a height of the groove (H) is controllable by controlling a size of the first region 1000*a*, and a shape of the groove (H) is changeable in various ways by using the mask 1000 with the circular or oval first region 1000*a*.

Ultraviolet rays may be radiated in a curing process to form the light blocking member including the dome shaped portion (DS) of which the center of the groove (H) is concave.

The second substrate 210 may be disposed so that the dome shaped portion (DS) of the light blocking member may correspond to the color spacer (CS) with respect to the first substrate 110. The second substrate 210 may be bonded to the first substrate 110 by using a sealant (not shown), and liquid crystal may be injected into a space between the first substrate 110 and the second substrate 210 by using a vacuum injection method to form a liquid crystal layer or a liquid crystal layer may be formed by dripping liquid crystal.

According to the exemplary embodiments of the present invention, the light blocking member provided on an opposing surface of the column spacer may be formed to be a dome shaped portion having a concave surface or shape so the respective substrates can be easily restored to their original positions when they are bent or are separated, and maintain the cell gap.

In addition, other characteristics and advantages are provided by the exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate and a second substrate facing the first substrate;
a column spacer disposed on the first substrate;
a light blocking member disposed on the second substrate to face the column spacer; and
a liquid crystal layer disposed between the first substrate and the second substrate,
wherein the light blocking member includes a dome shaped portion having a concave surface, and
wherein the concave surface facing the column spacer is formed as a dome shape without an angled portion, and
wherein the perimeter of the concave surface is a circular or oval shape.

2. The liquid crystal display of claim 1, wherein:
the column spacer is disposed at a position that corresponds to the dome shaped portion.

3. The liquid crystal display of claim 2, wherein:
the light blocking member includes a first light blocking member extended along a data line of a thin film transistor and a second light blocking member extended along a gate line of the thin film transistor.

4. The liquid crystal display of claim 3, wherein:
the second light blocking member includes the dome shaped portion.

5. The liquid crystal display of claim 1, wherein:
the liquid crystal display includes a plurality of color filters disposed on the first substrate.

6. The liquid crystal display of claim 5, wherein:
the column spacer is disposed on the color filters.

7. The liquid crystal display of claim 1, wherein:
the liquid crystal display includes a plurality of color filters disposed on the second substrate.

8. The liquid crystal display of claim 7, wherein:
the light blocking member is disposed on the color filters.

9. A method for manufacturing a liquid crystal display, comprising:
forming a color filter on a first substrate;
forming a column spacer on the color filter; and
forming a light blocking member on a second substrate facing the first substrate,
wherein the light blocking member includes a dome shaped portion having a concave surface, and
wherein the concave surface facing the column spacer is formed as a dome shape without an angled portion, and
wherein the perimeter of the concave surface is a circular or oval shape.

10. The method of claim 9, wherein:
the column spacer is formed at a position that corresponds to the dome shaped portion.

11. The method of claim 9, wherein:
the forming of a light blocking member comprises:
coating a photoresist on the second substrate;
performing an exposure process by using a mask including a first region, a second region, and a third region; and
developing and curing the photoresist.

12. The method of claim 11, wherein:
the first region blocks light generated by a light exposer and corresponds to the dome shaped portion, the second region allows the light generated by the light exposer to pass through, and the third region blocks the light generated by the light exposer.

13. The method of claim 12, wherein:
a height of the dome shaped portion is controlled by controlling a size of the first region.

14. A liquid crystal display, comprising:
a first substrate and a second substrate facing the first substrate;
a column spacer disposed on the first substrate;
a light blocking member disposed on the second substrate to face the column spacer; and
a liquid crystal layer disposed between the first substrate and the second substrate,
wherein the light blocking member has a concave groove in which a portion of the column spacer is configured to be accommodated,
wherein the concave groove is formed as a dome shape without an angled portion, and
wherein the perimeter of the concave groove is a circular or oval shape.

15. The liquid crystal display of claim 14, wherein:
the center of the concave groove corresponds to a designated location of the column spacer.

16. The liquid crystal display of claim 15, wherein:
the portion of the column spacer is configured to contact a side portion of the concave groove if the column spacer is relocated from the designated location such that the relocated location of the column spacer does not correspond to the center of the concave groove.

17. The liquid crystal display of claim 15, wherein:
the concave groove is a dome shape.

18. The liquid crystal display of claim 14, wherein:
the portion of the column spacer has a convex shape corresponding to the concave groove.

* * * * *